(12) United States Patent
Mei et al.

(10) Patent No.: US 11,163,194 B2
(45) Date of Patent: Nov. 2, 2021

(54) DISPLAY PANEL AND DISPLAY DEVICE

(71) Applicant: Wuhan China Star Optoelectronics Technology Co., Ltd., Wuhan (CN)

(72) Inventors: Xindong Mei, Wuhan (CN); Shaojun Hou, Wuhan (CN); Chao Wang, Wuhan (CN); Guanghui Liu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/763,568

(22) PCT Filed: Mar. 4, 2020

(86) PCT No.: PCT/CN2020/077687
§ 371 (c)(1),
(2) Date: May 13, 2020

(87) PCT Pub. No.: WO2020/192370
PCT Pub. Date: Oct. 1, 2020

(65) Prior Publication Data
US 2021/0215974 A1 Jul. 15, 2021

(30) Foreign Application Priority Data

| Mar. 26, 2019 | (CN) | 201910232120.7 |
| Mar. 27, 2019 | (CN) | 201910239505.6 |
| May 28, 2019 | (CN) | 201910449306.8 |
| Oct. 24, 2019 | (CN) | 201911017511.3 |

(51) Int. Cl.
*G02F 1/13357* (2006.01)
*G09G 3/34* (2006.01)
*G02F 1/1335* (2006.01)

(52) U.S. Cl.
CPC .. *G02F 1/133608* (2013.01); *G02F 1/133528* (2013.01); *G02F 1/133603* (2013.01); *G02F 1/133611* (2013.01); *G02F 1/133615* (2013.01); *G02F 1/133621* (2013.01); *G09G 3/3406* (2013.01); *G02F 1/133612* (2021.01); *G09G 2320/0626* (2013.01)

(58) Field of Classification Search
None
See application file for complete search history.

(56) References Cited

U.S. PATENT DOCUMENTS

2020/0174319 A1* 6/2020 Chang ............... G02F 1/133514

FOREIGN PATENT DOCUMENTS

CN  208384291  *  1/2019  ........... G02F 1/1333

OTHER PUBLICATIONS

Translation of CN208384291 (Year: 2019).*

* cited by examiner

*Primary Examiner* — Phu Vu (57) ABSTRACT

The present invention provides a display panel and a display device. The display panel includes a display unit and a backlight module, wherein the display panel includes a main display area and a additional function area. The backlight module includes a first light source block providing a light source for the main display area, and a second light source block providing a light source for the functional additional area.

18 Claims, 10 Drawing Sheets

DISPLAY PANEL AND DISPLAY DEVICE

RELATED APPLICATIONS

This application is a National Phase of PCT Patent Application No. PCT/CN2020/077687 having International filing date of Mar. 4, 2020, which claims the benefit of priority of Chinese Patent Application Nos. 201911017511.3 filed on Oct. 24, 2019, 201910449306.8 filed on May 28, 2019, 201910239505.6 filed on Mar. 27, 2019 and 201910232120.7 filed on Mar. 26, 2019. The contents of the above applications are all incorporated by reference as if fully set forth herein in their entirety.

FIELD AND BACKGROUND OF THE INVENTION

The present invention relates to a field of display technology, and in particular, to a display panel and a display device.

With increasing popularity of mobile portable devices, high screen-to-body ratios have become a future development trend of electronic devices such as mobile phones and tablets because they can give users a better visual experience. The screen-to-body ratio is used to indicate the relative ratio in areas of the screen to a front panel of the mobile phone, which reflects the user's visual experience on mobile devices. How to achieve a 100% screen-to-body ratio display effect is a problem that the industry urgently needs to solve.

However, for mobile devices such as mobile phones, in addition to the display screen, some electronic components such as cameras, flashes, light sensors, etc. need to be placed on the top of the front panel, and such components need to be illuminated from the front of the panel. Since traditional screens may shield the above electronic components, a common practice in the industry is to cut the front panel in a notch shape, that is, to cut out a portion of the screen to achieve light transmission, so as to ensure normal operation of the electronic components. While the above method destroys integrity of the entire screen, it still cannot achieve a full-display of 100% screen-to-body ratio.

Another solution for the full-screen is to manufacture an electronic component such as a front camera on to a separate mechanical module to serve as an independently controlled component, which is hidden inside the body of the mobile devices by default. When a user has a need to take pictures, video, etc., the camera will pop up automatically or slide out manually in response to system's instructions, which is the so-called "pop-up" or "slider" design. However, due to the mechanical structure, a pop-up time of the camera may delay, having an opening speed lags behind the traditional camera. Secondly, because the mechanical structure is affected by the assembly process, there is a gap between the pop-up function module and the display panel body, easy to be invaded by external powder or dust, thus failing to achieve good waterproof and dustproof. Moreover, the mechanical structure of the pop-up design has a high failure rate, and the slider design is prone to the problem of damage to the cable caused by artificial force, so this solution still impacts the user experience of the product.

Therefore, there is an urgent need in this field to realize a full-screen display without damaging the screen integrity and introducing a new mechanical structure.

SUMMARY OF THE INVENTION

The present application provides a display panel and a display device, so as to realize a full-screen display without damaging the screen integrity and introducing a new mechanical structure.

In a first aspect, the present application provides a display panel, where the display panel includes:

a display unit, including a main display area and an additional function area, wherein at least a part of the additional function area is surrounded by the main display area, the main display area is a conventional display area, and the additional function area is a transparent display area; and a backlight module, including a first light source block providing a light source for the main display area and a second light source block providing a light source for the additional function area.

In some embodiments, the backlight module is provided with a first through hole penetrating therethrough, the first through hole corresponds to the additional function area, and the second light source block is disposed close to the first through hole.

In some embodiments, a distance between the second light source block and the first through hole is smaller than a distance between the first light source block and the first through hole.

In some embodiments, the additional function area is located at an edge of the display unit, and the second light source block is located at a side of the first through hole and close to the additional function area.

In a second aspect, the present application further provides a display panel, where the display panel includes:

a display unit, including a main display area and an additional function area, wherein at least a part of the additional function area is surrounded by the main display area; and a backlight module, including a first light source block providing a light source for the main display area and a second light source block providing a light source for the additional function area.

In some embodiments, the backlight module is provided with a first through hole penetrating therethrough, the first through hole corresponds to the additional function area, and the second light source block is disposed close to the first through hole.

In some embodiments, a distance between the second light source block and the first through hole is smaller than a distance between the first light source block and the first through hole.

In some embodiments, the additional function area is located at an edge of the display unit, and the second light source block is located at a side of the first through hole and close to the additional function area.

In some embodiments, the backlight module includes a backlight plate, the first through hole is disposed on the backlight plate, and the first light source block is disposed on a side of the backlight plate close to an edge of the display unit.

In some embodiments, the second light source block is disposed around the first through hole.

In some embodiments, the second light source block includes a light board and at least one light source disposed on the light board.

In some embodiments, a plurality of light sources are disposed on the light board, and distributed around the first through hole.

In some embodiments, the light source is an LED or a mini-LED.

In some embodiments, the second light source block includes a ring-shaped light source disposed around the first through hole.

In some embodiments, the additional function area is configured to correspondingly dispose an electronic component, and when the electronic component does not work, the second light source block provides a light source for the additional function area, such that the main display area and the additional function area both display images.

In some embodiments, the display unit is disposed on the backlight module, and the display unit includes a first substrate and a second substrate disposed opposite to each other, and a liquid crystal layer disposed between the first substrate and the second substrate, and wherein the display unit further includes a lower polarizer disposed between the first substrate and the backlight module, and an upper polarizer disposed on a side of the second substrate away from the liquid crystal layer.

In some embodiments, a second through hole is provided at an area of each of the upper polarizer and the lower polarizer corresponding to the additional function area.

In some embodiments, the light source of the second light source block includes light sources of RGB three-primary colors, an LED, or a mini-LED.

According to a third aspect, the present invention still provides a display device, including a display panel, the display panel including:

a display unit, including a main display area and an additional function area, wherein at least a part of the additional function area is surrounded by the main display area; and a backlight module, including a first light source block providing a light source for the main display area and a second light source block providing a light source for the additional function area.

In some embodiments, the display device further includes an electronic component, and the electronic component is disposed corresponding to an additional function area of the display panel, and wherein when the second light source block is turned on, the electronic component does not work, and the main display area and the additional function area both display images; while when the second light source block is turned off, the electronic component works, and the additional function area does not display an image.

By disposing the additional function area at an area corresponding to the electronic components, the additional function area can be switched between a transparent state and an image display state according to requirements, which can achieve a full-screen display effect without destroying the screen integrity and introducing a new mechanical structure, and meanwhile a position of the second light source block that provides illumination for the additional function area is designed, so that the additional function area has a good display and light transmission function wherever it is located on the display panel.

Elements in the drawings are designated by reference numerals listed below.

10. display unit; 11. main display area; 12. additional function area; 13. first substrate; 14. second substrate; 15. liquid crystal layer; 151. first liquid crystal layer; 152. second liquid crystal layer; 16. upper polarizer; 17. lower polarizer; 20, backlight module; 21, first backlight area; 22, second backlight area; 221, light transmission area; 222, light source area; 223, transparent irradiation area; 224, non-transparent irradiation area; 23, first through hole; 24, reflection sheet; 25, light guide plate; 26, diffusion sheet; 27, backlight plate; 30, electronic component; 31, lens; 41, first light source block; 42, second light source block; 50, package cover plate; 60, optical adhesive; 70, second through hole; 80, partition; 90, light plate.

DETAILED DESCRIPTION OF SPECIFIC EMBODIMENTS OF THE INVENTION

The following description of the various embodiments is provided to illustrate the specific embodiments of the invention. The spatially relative directional terms mentioned in the present invention, such as "upper", "lower", "before", "after", "left", "right", "inside", "outside", "side", etc. and the like, may be used herein for ease of description to describe one element or feature's relationship to another element(s) or feature(s) as illustrated in the figures which are merely references. The spatially relative terms are intended to encompass different orientations in addition to the orientation as depicted in the figures.

Embodiment 1

Figure 1:
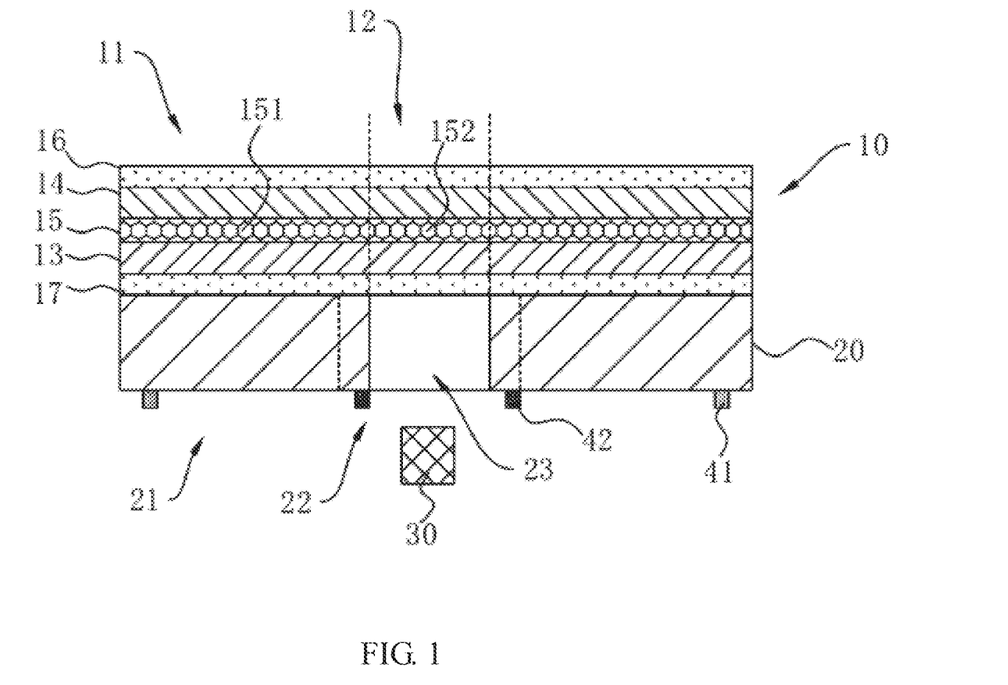
FIG. 1 is a schematic structural diagram of a display device according to Embodiment 1 of the present invention.

As shown in FIG. 1, a display panel includes a display unit 10 and a backlight module 20.

Specifically, the display unit 10 is disposed on the backlight module 20 for image display. The display unit 10 includes a main display area 11 and an additional function area 12, wherein at least a part of the additional function area 12 is surrounded by the main display area 11, the main display area 11 is a conventional display area, and the additional function area 12 is a transparent display area.

The additional function area 12 is configured to correspondingly dispose an electronic component 30, wherein when the electronic component 30 does not work, the main display area 11 and the additional function area 12 both display images, and when the electronic component 30 works, and the additional function area 12 does not display an image. In this case, the additional function area 12 is in a transparent state for providing a lighting channel for the electronic component 30, thereby realizing the function of the electronic component 30.

Specifically, when the electronic component does not work 30, the main display area 11 and the additional function area 12 may display an image together, or may display different images, respectively.

It should be noted that the display unit 10 according to the present invention may be a liquid crystal display unit.

Specifically, the backlight module 20 includes a first light source block 41 that provides a light source for the main display area 11 and a second light source block 42 that provides a light source for the additional function area 12. The first light source block 41 and the second light source block 42 respectively provide light sources for the main display area 11 and the additional function area 12 independently.

By disposing two independent light source blocks, the main display area 11 and the additional function area 12 can display images at the same time, and when the main display area 11 normally displays, the additional function area 12 does not display images.

It should be noted that both the first light source block 41 and the second light source block 42 may be light sources of RGB three-primary colors, LEDs or Mini LEDs.

The backlight module 20 is provided with a first through hole 23 corresponding to the additional function area 12, and the first through hole 23 penetrates the backlight module 20 to provide a lighting channel for the electronic component 30 corresponding to the additional function area 12.

When the electronic component 30 does not work, the second light source block 42 provides a light source for the additional function area 12, so that the main display area 11 and the additional function area 12 display an image together. When the electronic component 30 works, the second light source block 42 is turned off, and the additional function area 12 does not display an image, wherein the first through hole 23 is configured to provide a lighting channel for the electronic component 30.

The second light source block 42 is disposed close to the first through hole 23.

Specifically, the display unit 10 includes a first substrate 13 and a second substrate 14 disposed opposite to each other, and a liquid crystal layer 15 disposed between the first substrate 13 and the second substrate 14.

The first substrate 13 may be an array substrate, and the second substrate 14 may be a color filter substrate.

In an embodiment, the liquid crystal layer 15 includes a first liquid crystal layer 151 and a second liquid crystal layer 152 which are made of different materials. The first liquid crystal layer 151 is disposed at the main display area 11 and the second liquid crystal layer 152 is correspondingly disposed at the additional function area 12. Specifically, the first liquid crystal layer 151 is disposed on areas of the display unit 10 other than the additional function area 12.

In this embodiment, the first liquid crystal layer 151 may be an ordinary liquid crystal of the prior art. The first liquid crystal layer 151 includes a plurality of liquid crystal molecules, and the liquid crystal molecules include biphenyl liquid crystals, phenylcyclohexane liquid crystals, or ester liquid crystals. The material of the second liquid crystal layer 152 includes a scattering liquid crystal, which includes a plurality of liquid crystal molecules and a polymer, such that switching between a transparent state and an image display state can be realized. The polymer may be made of an ionic organic electrolyte material.

The liquid crystal molecules of the first liquid crystal layer 151 (that is, the ordinary liquid crystal) are rotated after a voltage is applied, to control the light transmittance to realize a gray scale display. The second liquid crystal layer 152 (that is, the scattering liquid crystal) has a refractive index different from the first liquid crystal layer 151 due to addition of certain polymers, and by controlling the voltage to produce a difference in refractive index between a surface of the liquid crystal and a surface of the polymers, light is allowed to pass through or scatter on both surfaces, so it can achieve a transparent state or a fog state. In the transparent state, light can be transmitted, while in the fog state, light can be scattered for image display.

A specific process for the second liquid crystal layer 152 is as follows: the liquid crystal and the polymer have the same anisotropic dielectric constant, and when no voltage is applied or the applied voltage is lower than a threshold voltage, the liquid crystal molecules are aligned horizontally and have no refractive index difference with respect to the polymer material, so no scattering occurs; while when the applied voltage is higher than the threshold voltage, the liquid crystal molecules rotate and are aligned along the vertical direction, which changes the anisotropic characteristics of the dielectric constant of the liquid crystal, such that the difference in refractive index between a surface of the liquid crystal and a surface of the polymers causes light to scatter there and be seen by an observer.

Specifically, the display unit 10 further includes a lower polarizer 17 disposed between the first substrate 13 and the backlight module 20, and an upper polarizer 16 disposed on a side of the second substrate 14 away from the liquid crystal layer 15.

In an embodiment, the electronic component 30 includes one or combination of a camera, a flash, a light sensor, a breathing light sensor, a distance sensor, a fingerprint scanner sensor, a microphone sensor, and a transparent antenna sensor.

It should be noted that, taking the electronic component 30 being a camera as an example, when the camera is not required to work, the camera is turned off, the display unit 10 is in a screen display state for image display, wherein the first light source block 41 provides a light source for the display of the main display area 11, and the second light source block 42 provides a light source for the display of the additional function area 12. In this case, the main display area 11 and the additional function area 12 display an image together, and the display unit 10 is in a full-screen display state. When the camera is required to work, the first light source block 41 provides a light source for the main display area 11, which thereby normally displays, and the second light source block 42 is closed. In this case, the second liquid crystal layer 152 of the additional function area 12 is transparent, and external light passes through the additional function area 12 and the first through hole 23 to enter the camera to complete image capturing.

By disposing the additional function area 12 at an area corresponding to the electronic component 30 and using the second light source block 42 to provide a light source for the additional function area 12, the additional function area 12 can be switched between a transparent states and an image display state according to requirements, which can achieve a full-screen display effect without destroying the screen integrity and introducing a new mechanical structure.

It should be noted that the additional function area 12 may be located at any position on the display unit 10, and the additional function area 12 has a shape selected from any one of bangs, widow's peaks, drops, circles, triangles, rectangles, and polygons.

Specifically, the backlight module 20 further includes a first backlight area 21 for disposing a first light source block 41 and a second backlight area 22 for disposing a second light source block 42, wherein at least a part of the second backlight area 22 is surrounded by the first backlight area 21, and the first through hole 23 is located in the second backlight area 22.

An orthographic projection of the display unit 10 on the backlight module 20 covers the second backlight area 22, that is, the second light source block 42 is provided in an area restricted by the orthographic projection of the display unit 10 on the backlight module.

Embodiment 2

Figure 2:
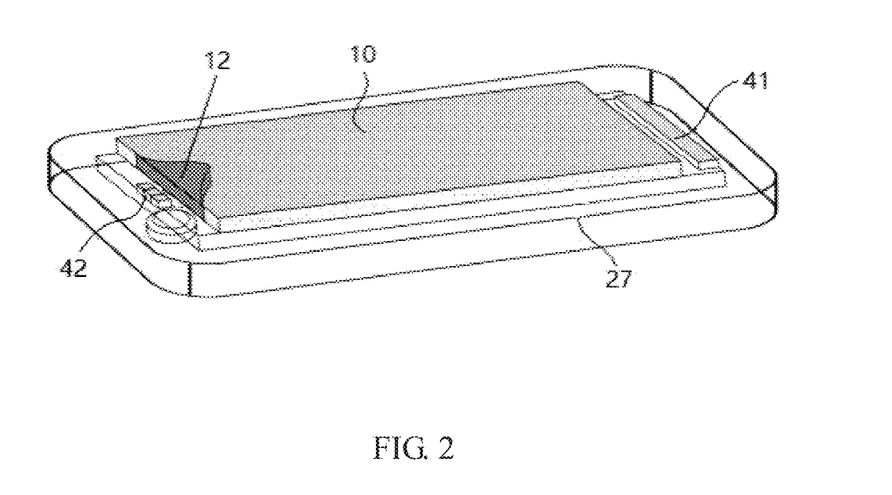
FIG. 2 is a schematic perspective structural diagram of a display device according to Embodiment 2 of the present invention.
Figure 3:
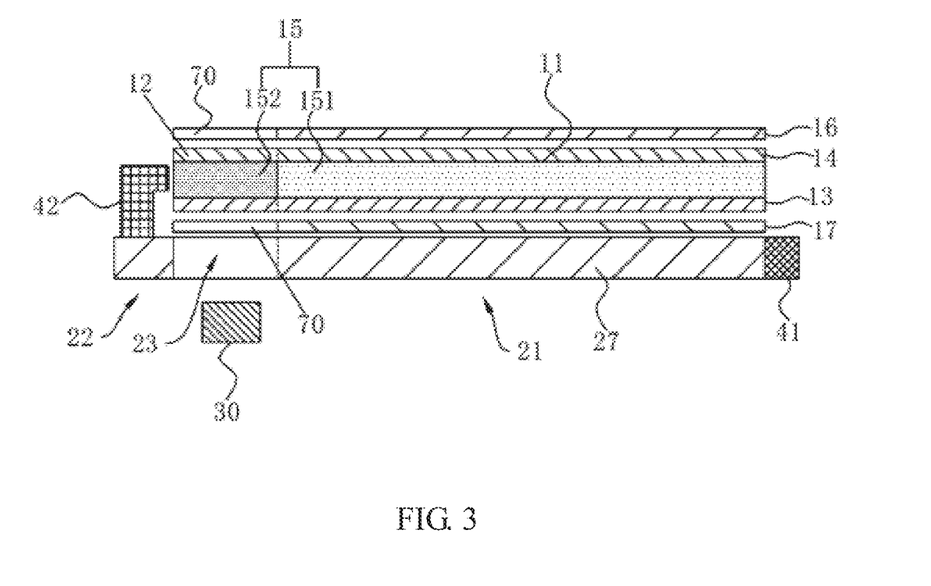
FIG. 3 is a cross-sectional diagram of a display device according to Embodiment 2 of the present invention.
Figure 4:
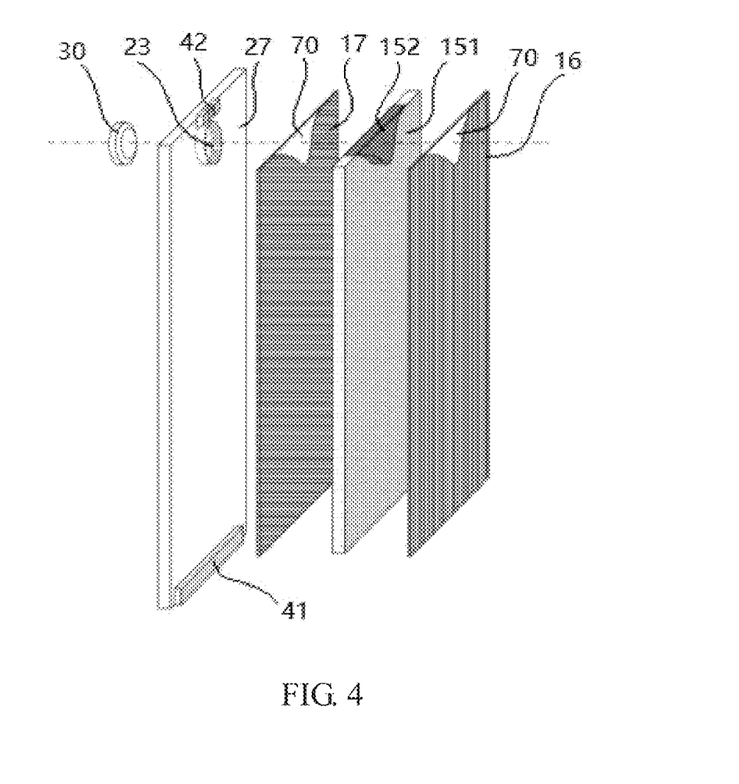
FIG. 4 is a schematic diagram of a partially exploded structure of a display device according to Embodiment 2 of the present invention.

As shown in FIGS. 2 to 4, a display panel provided in Embodiment 2 is different from Embodiment 1 in that the additional function area 12 is located at an edge of the display unit 10, and the second light source block 42 is located at a side of the first through hole 23 and is close to the additional function area 12 to laterally light the additional function area 12 through the second light source block 42, such that the second light source block 42 is prevented from impacting the display and light transmission of the additional function area 12.

Further, the second light source block 42 is located on a side of the display unit 10 and is close to the additional function area 12.

Specifically, the backlight module 20 includes a backlight plate 27, the first through hole 23 is disposed on the backlight plate 27, and the first light source block 41 is disposed on a side of the backlight plate 27 close to an edge of the display unit 10.

It should be noted that the backlight plate 27 may include an optical film such as a reflection sheet, a light guide plate, and a diffusion sheet.

In an embodiment, the first light source block 41 is disposed away from the first through hole 23. The first light source block 41 includes a white light source for providing a light source to the first liquid crystal layer 151. The second light source block 42 is disposed close to the first through hole 23, and the second light source block 42 includes light sources of RGB three-primary colors for providing a light source to the second liquid crystal layer 152 disposed in the additional function area 12 correspondingly, to display a color image.

Further, a distance between the second light source block 42 and the first through hole 23 is smaller than a distance between the first light source block 41 and the first through hole 23.

In an embodiment, the first light source block 41 and the second light source block 42 are respectively located at opposite ends of the backlight plate 27.

It should be noted that, referring to FIG. 4, in a specific implementation, the first light source block 41 may be placed on a bottom of the backlight plate 27 to provide light laterally, and the second light source block 42 may be placed on a top of the backlight plate 27 to provide light laterally. The placement of the second light source block 42 on the top of the backlight plate 27 is the preferred way to achieve this object, and embodiments of other placements are within the scope of the present invention.

Specifically, the lower polarizer 17 and the upper polarizer 16 are provided with second through holes 70 at positions corresponding to the additional function area 12.

It can be understood that the lower polarizer 17 and the upper polarizer 16 are located on opposite sides of the first liquid crystal layer 151, respectively, and they function to provide linearly polarized light and realize change of brightness of the display screen of the first liquid crystal layer 151. The light transmission ability of the second liquid crystal layer 152 in a transparent state is ensured by digging a hole in the lower polarizer 17 and the upper polarizer 16 corresponding to the first through hole 23, that is, disposing the second through hole 70 to form an area without polarizing functions.

In an embodiment, an area of the first through hole 23 is smaller than an area of the second through hole 70. This arrangement can ensure that the second liquid crystal layer 152 can completely display without being blocked.

Embodiment 3

Figure 5:
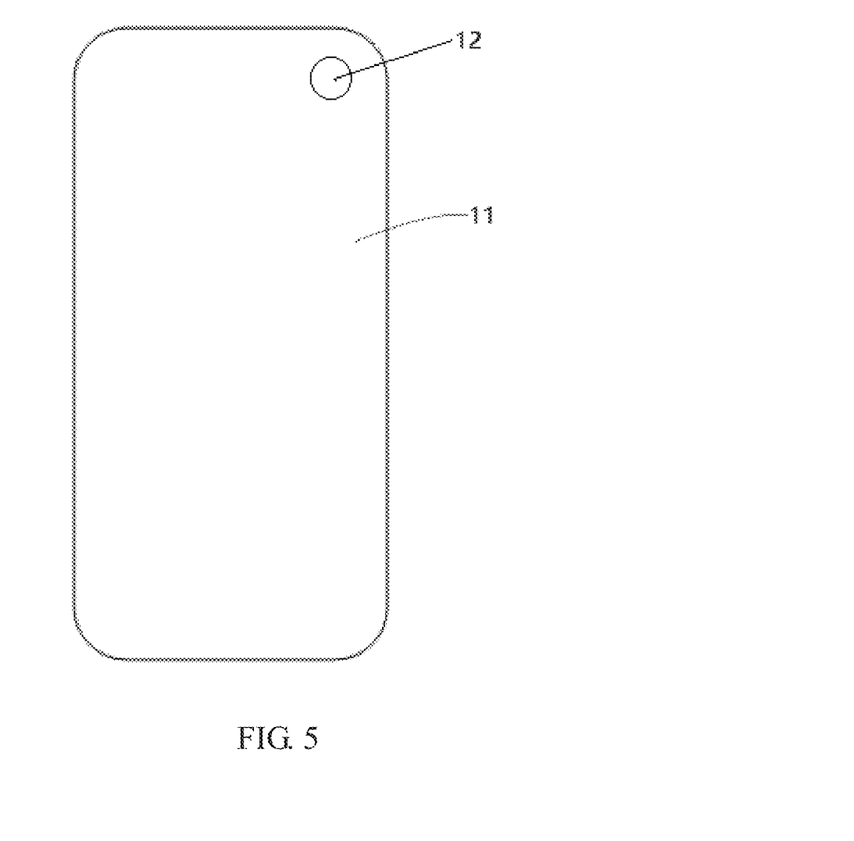
FIG. 5 is a schematic plan structural diagram of a display device according to Embodiment 3 of the present invention.
Figure 6:
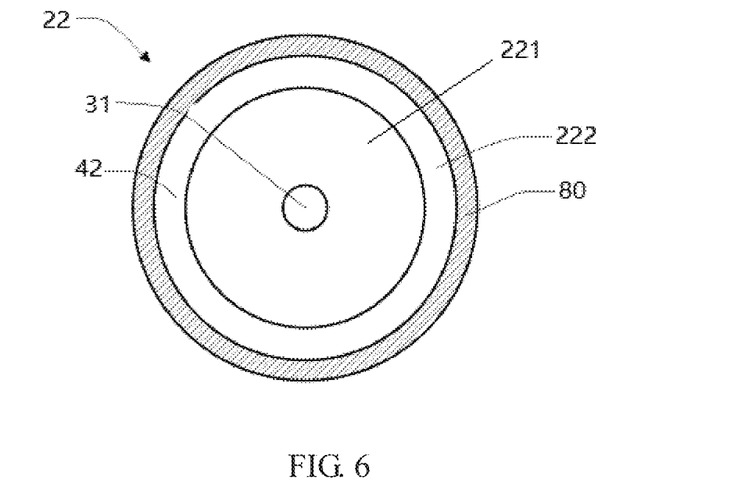
FIG. 6 is a schematic structural diagram of a second backlight area according to Embodiment 3 of the present invention.
Figure 7:
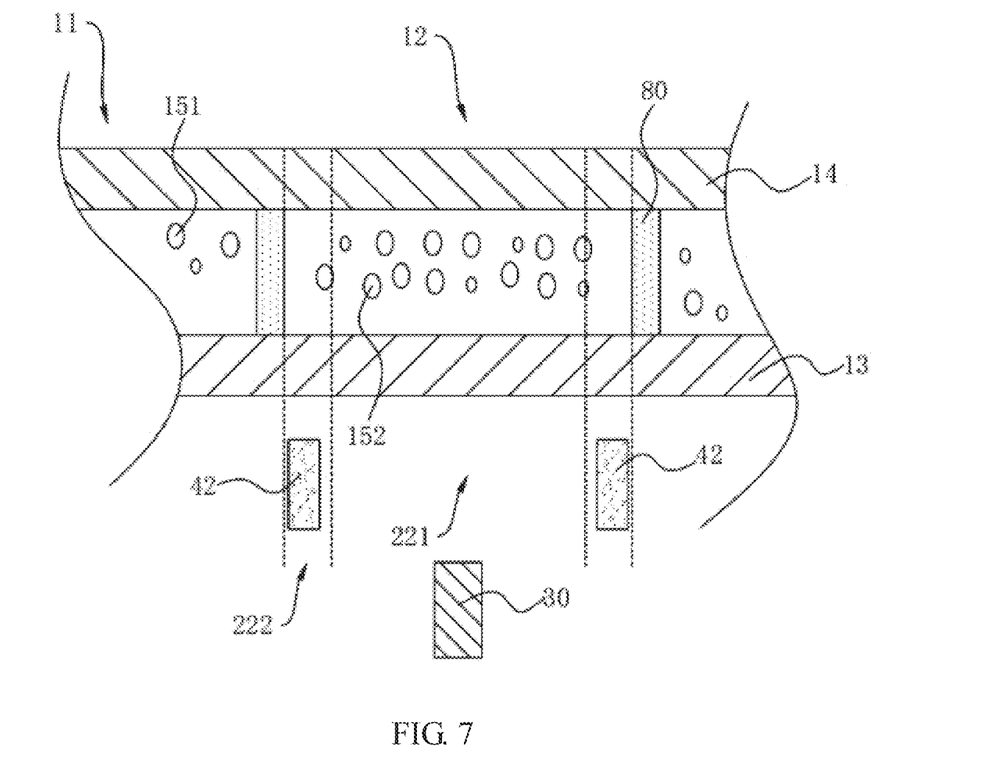
FIG. 7 is a schematic structural diagram of a display device according to Embodiment 3 of the present invention.

As shown in FIGS. 5 to 7, a display panel provide in Embodiment 3 is different from Embodiment 1 in that the second light source block 42 is disposed around the first through hole 23.

The additional function area 12 may be located at any position on the display unit 10, and can achieve both a photographing effect and a display effect.

In an embodiment, taking the electronic component 30 being a camera as an example, the additional function area 12 has a circular shape, the electronic component 30 includes a lens 31, and the lens 31 has a circle shape corresponding to the additional function area.

When the additional function area 12 performs photographing processing, the lens 31 is configured to acquire light incident onto the additional function area 12, so that the camera can realize imaging. The lens 31 is located at a center of the additional function area 12, and has a center axis on the same line with a center axis of the additional function area 12. The additional function area 12 and the lens 31 are both circular, and an edge of the lens 31 and an edge of the additional function area 12 constitute a concentric circle structure.

Specifically, the second backlight area 22 includes a light transmission area 221 corresponding to the first through hole 23 and a light source area 222 provided around the light transmission area 221. The second light source block 42 is disposed in the light source area 222.

In an embodiment, the light source area 222 has a circular shape, disposed in the second backlight area 22, and connected to the first backlight area 21. The light source area 222 includes an inner circular edge and an outer circular edge. The outer circular edge is connected to the first backlight area 21. A surface of the light source area 222 is a silver-plated layer. A size of an inner diameter of the light source area 222 corresponds to a size of a diameter of the light transmission area 221. A size of an outer diameter of the light source area 222 corresponds to a size of a circle surrounded by the first backlight area 21.

In an embodiment, the second light source block 42 includes a ring-shaped light source disposed around the light-transmitting area 221.

In another embodiment, the second light source block 42 includes at least two light sources disposed around the first through hole 23, and the light sources are evenly distributed.

Two or more light sources are evenly distributed in the light source area 222 and protrude from a surface of the light source area 222 to ensure that the light beam emitted by the second light source block 42 can completely cover a visual field of the additional function area 12 to provide a uniform light source, such that there will be no bright or dark areas within the additional function area 12, thus ensuring uniform display and clear image, thereby improving the display quality of the display panel. The second light source block 42 is an LED lamp or a mini-LED lamp bead, whose brightness is determined by specifications of the lamp.

When the additional function area 12 of the display panel is used for display, the second light source block 42 emits light to illuminate all the area of the additional function area 12, so that the additional function area 12 can display an image together with the main display area 11. In this case, the full-screen display is achieved. Light beam emitted by the second light source block 42 uniformly provides light to the additional function area 12 to avoid problems such as inconsistency and/or unevenness of light in the additional function area 12.

In addition, since the designed circuit of the additional function area 12 is different from the designed circuit of the main display area 11, when designing the circuit of the additional function area 12, the amount of light transmitted can be changed by adjusting a panel voltage to change the display brightness, which can further improve the display quality of the display panel.

In an embodiment, a number of light sources included in the second light source block 42 is preferably 4, 6, or 8. Those skilled in the art may also set the number of light sources according to a distribution range of the light source area 222.

In an embodiment, a partition area 80 is provided between the main display area 11 and the additional function area 12. The partition area 80 has shape of a circular ring surrounded by transparent optical adhesive to isolate the first liquid crystal layer 151 from the second liquid crystal layer 152. In this way, the light of the second light source block 42 located in the light source area 222 can also cover the partition area 80, avoiding the problem of existence of dark areas in the partition area 80, thus improving the display quality of the display panel.

It should be noted that the transparent optical adhesive has stronger adhesiveness and is provided between the first substrate 13 and the second substrate 14 to fix the first substrate 13 and the second substrate 14.

In an embodiment, the lens 31 and the second light source block 42 are both disposed below the first substrate 13. The lens 31 has a center axis on the same line with a center axis of the additional function area 12. The second light source block 42 provides a light source for the additional function area 12 so that light enters the additional function area 12 from different angles. In this way, the light in the functional additional area 12 is evenly distributed, improving the clarity of the display screen and ensuring the display quality of the display panel.

It should be noted that the second light source block 42 may be disposed on a peripheral of the first through hole 23, or may be located at an area corresponding to the first through hole 23.

Figure 8:
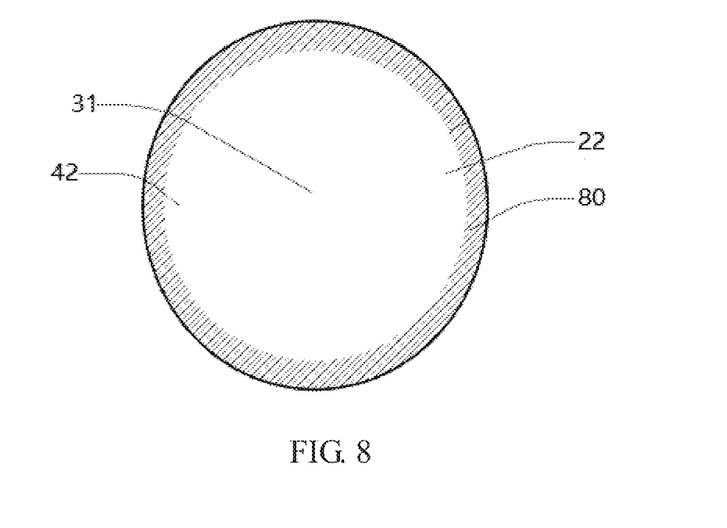
FIG. 8 is another schematic structural diagram of a second backlight area according to Embodiment 3 of the present invention.
Figure 9:
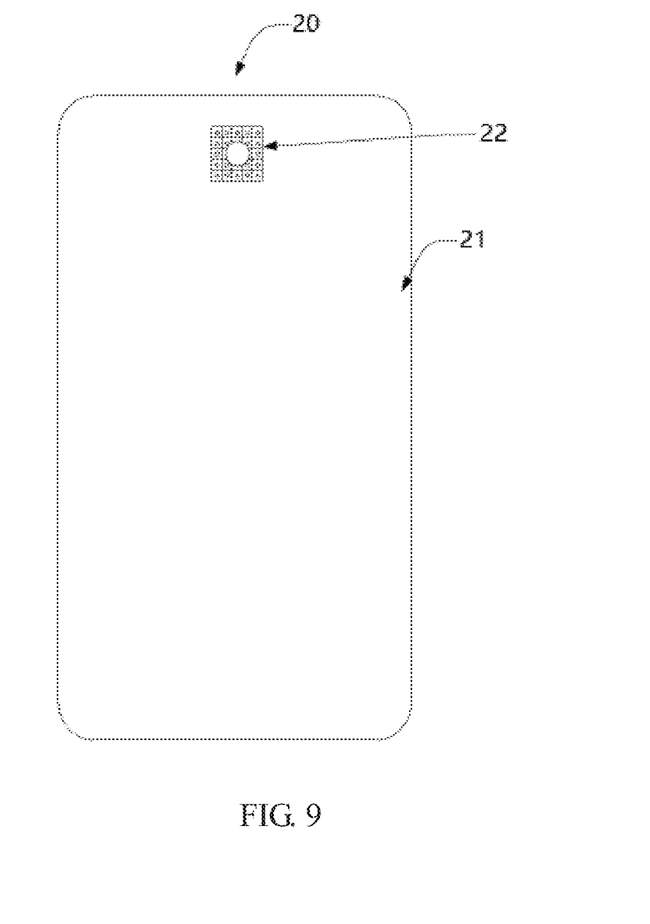
FIG. 9 is a schematic plan structural diagram of a display device according to Embodiment 4 of the present invention.
Figure 10:
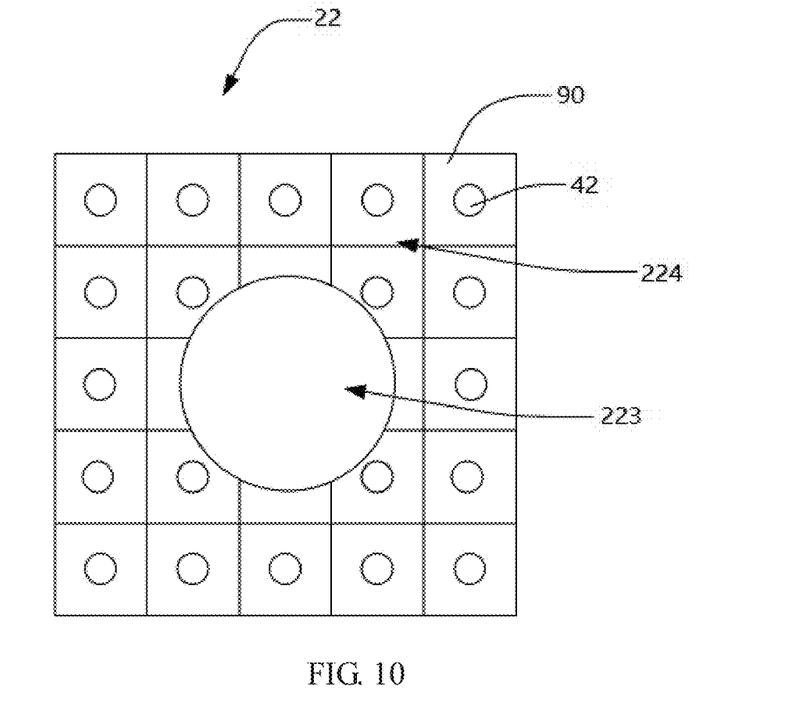
FIG. 10 is a schematic structural diagram of a second backlight area according to Embodiment 4 of the present invention.
Figure 11:
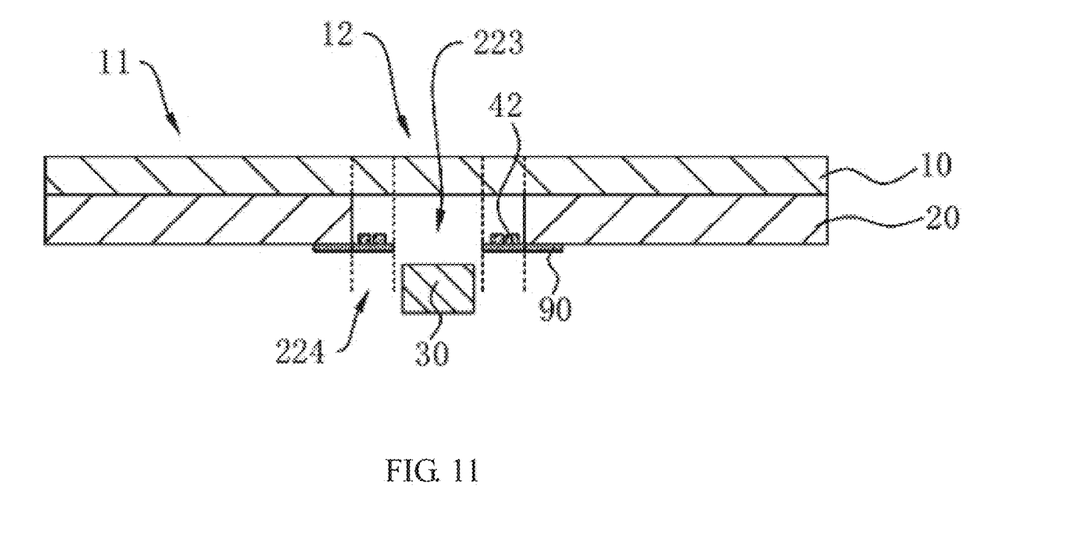
FIG. 11 is a first schematic structural diagram of a display device according to Embodiment 4 of the present invention.

As shown in FIG. 8, the second light source blocks 42 protrude from a surface of the light source area 222, and the light of each of the second light source blocks 42 is evenly diffused at various angles, so that the light enters the additional function area 12 from different angles, making the light of the additional function area 12 evenly distributed to improve the sharpness of the display screen and ensure the display quality of the display panel.

Embodiment 4

As shown in FIGS. 8 to 11, a display panel provided in Embodiment 4 is different from Embodiment 1 in that the second light source block 42 is disposed around the first through hole 23 and is disposed on a side of the backlight module 20 away from the display unit 10 to provide a uniform light source for the additional function area 12 corresponding to the first through hole 23.

Specifically, the second light source block 42 includes a light plate 90 and at least one light source disposed on the light plate 90.

The second backlight area 22 includes a transparent irradiation area 223 and a non-transparent irradiation area 224. The non-transparent irradiation area 224 is disposed around the transparent irradiation area 223, and the transparent irradiation area 223 corresponds to the additional function area 12. The additional function area 12 may be located at any position on the display unit 10.

It should be noted that the first through hole 23 corresponds to the transparent irradiation area 233, and an area where the second light source block 42 is located corresponds to the non-transparent irradiation area 224, wherein an area corresponding to the first through hole 23 and an area where the second light source block 42 is located together form a second backlight area 22.

The first through hole 23 penetrates the backlight module 20, and the shape of the first through hole 23 may be a square or a circle.

In an embodiment, the second light source block 42 includes a plurality of light sources, and the light sources in the second light source block 42 are distributed on the light plate 90 in an array. The plurality of light sources are distributed around the first through hole 23.

It should be noted that the light source may be a mini-LED lamp bead.

In an embodiment, the light plate 90 has a circle shape or a square shape, and the transparent irradiation area 223 has a circle shape.

A direction of light emitted by the mini-LED lamp bead in the non-transparent irradiation area 224 is preferably adjustable to ensure that the transparent irradiation area 223 obtains a uniform light source to achieve normal display of the transparent irradiation area in the display mode.

When the second backlight area 22 is lightened, the light source of the mini-LED lamp bead is turned off to avoid impacting the light collection of the electronic component 30.

When the electronic component does not work, the second light source block 42 provides a light source for the additional function area 12 so that the main display area 11 and the additional function area 12 display an image together, thereby entering a full-screen display state.

Figure 12:
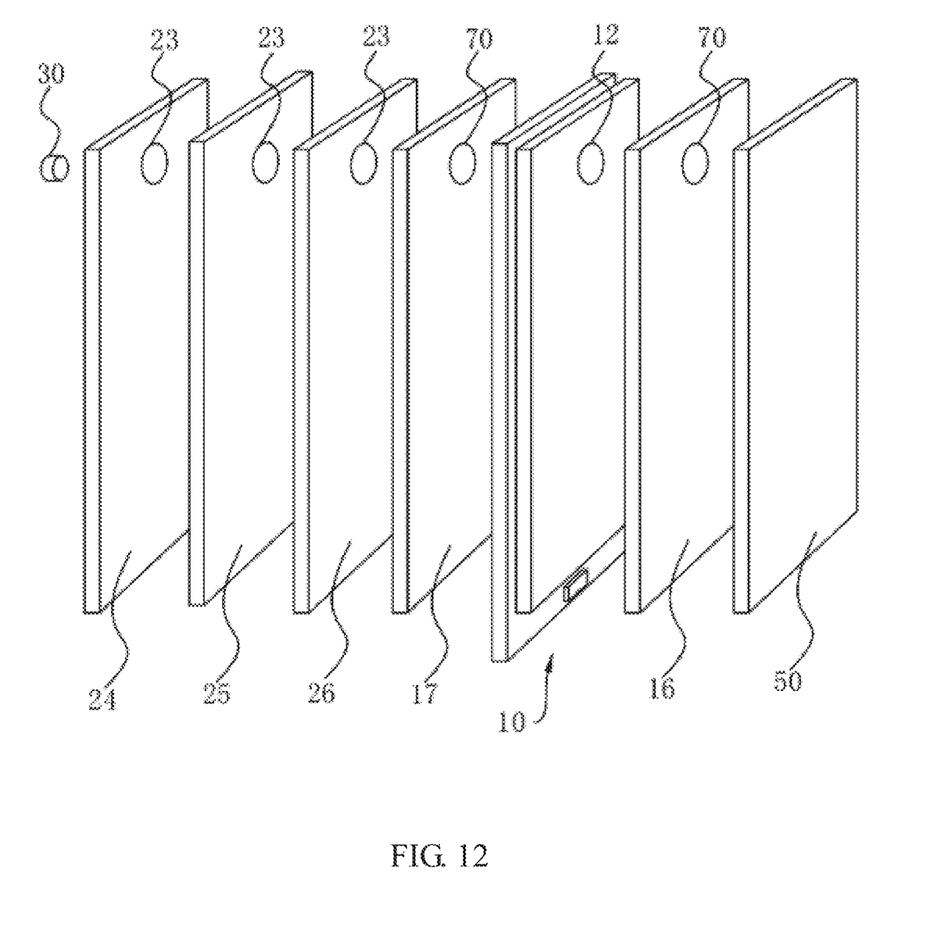
FIG. 12 is a partially exploded schematic diagram of a display device according to Embodiment 4 of the present invention.
Figure 13:
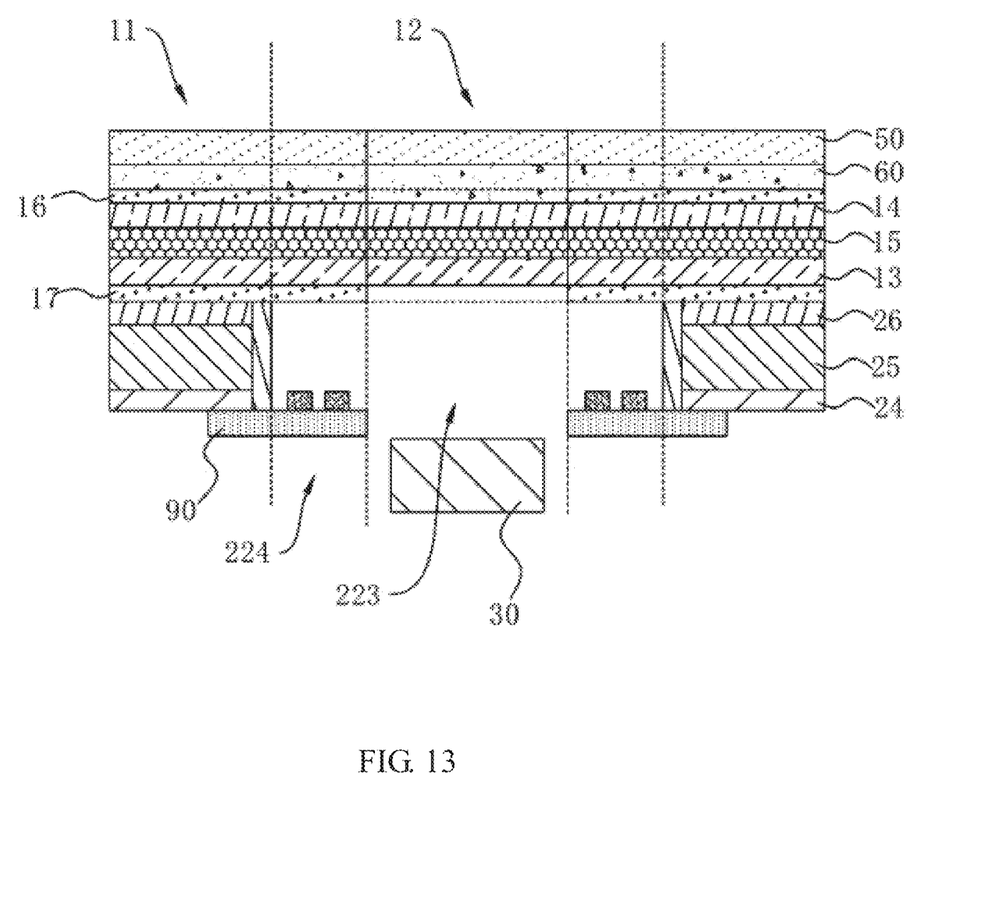
FIG. 13 is a schematic diagram of a second structure of a display device according to Embodiment 4 of the present invention.

In an embodiment, as shown in FIG. 12 and FIG. 13, the backlight module 20 includes a reflection sheet 24, a light guide plate 25, and a diffusion sheet 26 disposed sequentially.

It should be noted that the first light source block 41 and the second light source block 42 are disposed corresponding to the first through hole 23 and are located on a side of the first through hole 23 away from the display unit 10. The first light source block 41 and the second light source block 42 may be side-lit light sources or direct-type light sources. In actual implementation, the backlight module 20 may further include a back frame and a plastic frame.

When the first light source block 41 and the second light source block 42 are the side-lit light sources, each of the first light source block 41 and the second light source block 42 may be one or more mini-LED lamp beads or LEDs disposed on the side of the backlight module 20. When the first light source block 41 and the second light source block 42 are direct-type light sources, each of the first light source block 41 and the second light source block 42 may be a plurality of mini-LED lamp beads or LEDs evenly distributed in the first backlight area 21.

The light guide plate 25 is provided on the reflection sheet 24, and the diffusion sheet 26 is provided on a side of the light guide plate 25 away from the reflection sheet 24.

The combination of the light guide plate 25 and the diffusion sheet 26 is mainly for diffusing the light of the first light source block 41 to the display unit 10 to improve the brightness of the display unit 10.

Each of the lower polarizer 17 and the upper polarizer 16 is provided with a second through hole 70 at a position corresponding to the additional function area 12.

It can be understood that the lower polarizer 17 and the upper polarizer 16 are located on opposite sides of the first liquid crystal layer 151, respectively, and they function to provide linearly polarized light and realize change of brightness of the display screen of the first liquid crystal layer 151. Digging holes in the lower polarizer 17 and the upper polarizer 16 corresponding to the first through hole 23, that is, disposing the second through hole 70 to form an area without polarizing functions, such that the light transmission ability of the second liquid crystal layer 152 in a transparent state is ensured.

In an embodiment, a package cover plate 50 is further provided on a side of the upper polarizer 16 away from the liquid crystal layer 15, and the package cover plate 50 is bonded to the upper polarizer 16 through an optical adhesive layer 60. The package cover plate 50 may be a transparent glass cover plate or a transparent plastic cover plate.

The second backlight area 22 on the backlight module 20 is dug with holes, and the light plate 90 and the second light source block 42 are disposed around the transparent irradiation area 223. The electronic component 30 is disposed below the transparent irradiation area 223 to form a complete display device. In a display mode, the additional function area 12 obtains a uniform light source, so that the additional function area 12 can display normally when the display device is in the display mode, so as to achieve a real screen-to-body ratio. When the electronic component 30 is in a lighting mode, the second light source block 42 is turned off to prevent the lighting of the electronic component 30 from being impacted.

Based on the above display panel, the present invention further provides a display device including the display panel according to any one of Embodiments 1 to 4.

Wherein, the display device further includes an electronic component 30, and the electronic component 30 is disposed corresponding to the additional function area 12 of the display panel.

When the second light source block 12 is turned on, the electronic component 30 does not work, and the main display area 11 and the additional function area 12 both display images; while when the second light source block 42 is turned off, the electronic component 30 works, and the additional function area 12 does not display an image, and the main display area 11 can display an image normally.

In an embodiment, the electronic component 30 is located outside the first through hole 23 and on a side of the backlight module 20 away from the display unit 10.

It should be noted that the electronic component 30 includes one or a combination of a camera, a flash, a light sensor, a breathing light sensor, a distance sensor, a fingerprint scanner sensor, a microphone sensor, and a transparent antenna sensor.

Figure 14:
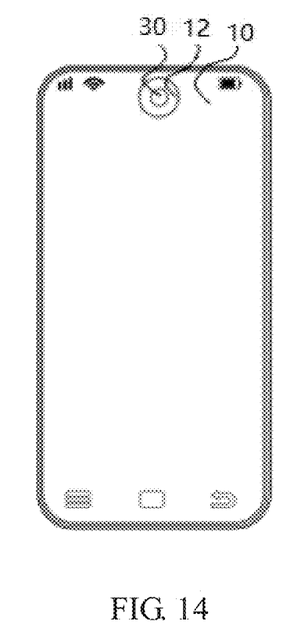
FIG. 14 is a schematic plan structural diagram of a display device according to the present invention, wherein the additional function area is circular.
Figure 15:
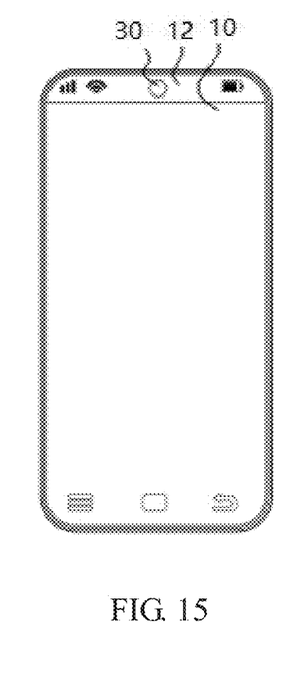
FIG. 15 is a schematic plan structural diagram of a display device according to the present invention, wherein the additional function area is rectangular.
Figure 16:
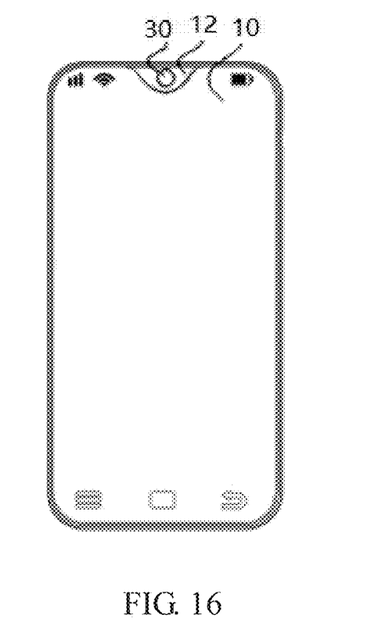
FIG. 16 is a top view showing a display effect of an on state of an electronic component of a display device according to the present invention.

Referring to FIG. 14 to FIG. 16. In an embodiment, the first through hole 23 or/and the second through hole 70 has a shape selected from any one of bangs, widow's peaks, drops, circles, triangles, rectangles, and polygons, and the additional function area 12 has a shape selected from any one of bangs, widow's peaks, drops, circles, triangles, rectangles, and polygons.

Figure 17:
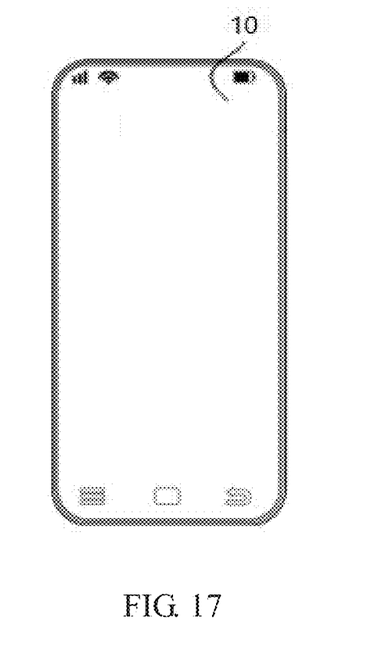
FIG. 17 is a top view showing a display effect of an off state of an electronic component of a display device according to the present invention.

Referring to FIG. 16 and FIG. 17, taking the electronic component 30 being a camera as an example, FIG. 16 and FIG. 17 are top views showing a display effect of an on state and an off state of the camera, respectively. As shown in FIG. 16, when the camera is turned on, the display image disappears and becomes transparent, to provide a lighting channel for the camera behind it. As shown in FIG. 17, when the camera is turned off, an image is displayed, and at this time, a full-screen display is achieved.

It can be understood that the display device provided by the present invention may be other display devices having a display function, such as a mobile phone, a computer, a television, and a car display device, which is not particularly limited in the present invention.

Beneficial effect of the present invention is that by disposing the additional function area at an area corresponding to the electronic components 30, the additional function area 12 can be switched between a transparent states and an image display state according to requirements, which can achieve a full-screen display effect without destroying the screen integrity and introducing a new mechanical structure, and meanwhile a position of the second light source block that provides illumination for the additional function area 12 is designed, so that the additional function area 12 has a good display and light transmission function wherever it is located on the display unit 10.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display panel, comprising:
   a display unit, comprising a main display area and an additional function area, wherein at least a part of the additional function area is surrounded by the main display area, the main display area is a conventional display area, and the additional function area is a transparent display area; and
   a backlight module, comprising a first light source block providing a light source for the main display area and a second light source block providing a light source for the additional function area,
   wherein the backlight module is provided with a first through hole penetrating through the backlight module, the first through hole is defined in the additional function area, and the second light source block is disposed in the main display area close to the first through hole.

2. The display panel according to claim 1, wherein a distance between the second light source block and the first through hole is smaller than a distance between the first light source block and the first through hole.

3. The display panel according to claim 1, wherein the additional function area is located at an edge of the display unit, and the second light source block is located at a side of the first through hole and close to the additional function area.

4. A display panel, wherein the display panel comprises:
   a display unit, comprising a main display area and an additional function area, wherein at least a part of the additional function area is surrounded by the main display area; and
   a backlight module, comprising a first light source block providing a light source for the main display area and a second light source block providing a light source for the additional function area,
   wherein the backlight module is provided with a first through hole penetrating through the backlight module, the first through hole is defined in the additional function area, and the second light source block is disposed in the main display area close to the first through hole.

5. The display panel according to claim 4, wherein a distance between the second light source block and the first through hole is smaller than a distance between the first light source block and the first through hole.

6. The display panel according to claim 4, wherein the additional function area is located at an edge of the display unit, and the second light source block is located at a side of the first through hole and close to the additional function area.

7. The display panel according to claim 6, wherein the backlight module comprises a backlight plate, the first through hole is disposed on the backlight plate, and the first light source block is disposed on a side of the backlight plate close to an edge of the display unit.

8. The display panel according to claim 4, wherein the second light source block is disposed around the first through hole.

9. The display panel according to claim 8, wherein the second light source block comprises a light board and at least one light source disposed on the light board.

10. The display panel according to claim 9, wherein a plurality of light sources are disposed on the light board, and distributed around the first through hole.

11. The display panel according to claim 10, wherein the light source is an LED or a mini-LED.

12. The display panel according to claim 8, wherein the second light source block comprises a ring-shaped light source disposed around the first through hole.

13. The display panel according to claim 4, wherein the additional function area is configured to correspondingly dispose an electronic component, and when the electronic component does not work, the second light source block provides a light source for the additional function area, such that the main display area and the additional function area both display images.

14. The display panel according to claim 4, wherein the display unit is disposed on the backlight module, and the display unit comprises a first substrate and a second substrate disposed opposite to each other, and a liquid crystal layer disposed between the first substrate and the second substrate, and wherein the display unit further comprises a lower polarizer disposed between the first substrate and the backlight module, and an upper polarizer disposed on a side of the second substrate away from the liquid crystal layer.

15. The display panel according to claim 14, wherein a second through hole is provided at an area of each of the upper polarizer and the lower polarizer corresponding to the additional function area.

16. The display panel according to claim 4, wherein the light source of the second light source block comprises light sources of RGB three-primary colors, an LED, or a mini-LED.

17. A display device, comprising a display panel, the display panel comprising:
   a display unit, comprising a main display area and an additional function area, wherein at least a part of the additional function area is surrounded by the main display area; and
   a backlight module, comprising a first light source block providing a light source for the main display area and a second light source block providing a light source for the additional function area,
   wherein the backlight module is provided with a first through hole penetrating through the backlight module, the first through hole is defined in the additional function area, and the second light source block is disposed in the main display area close to the first through hole.

18. The display device according to claim 17, wherein the display device further comprises an electronic component, and the electronic component is disposed corresponding to an additional function area of the display panel, and wherein when the second light source block is turned on, the electronic component does not work, and the main display area and the additional function area both display images; while when the second light source block is turned off, the electronic component works, and the additional function area does not display an image.

* * * * *